(12) United States Patent
Henslee et al.

(10) Patent No.: US 10,916,803 B1
(45) Date of Patent: Feb. 9, 2021

(54) LITHIUM-SULFUR BATTERY WITH HIGH SULFUR LOADING

(71) Applicant: Cornerstone Research Group, Inc., Miamisburg, OH (US)

(72) Inventors: Brian E. Henslee, Galloway, OH (US); Joel P. Brubaker, Dayton, OH (US); Frank M. Zalar, Beavercreek Township, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 106 days.

(21) Appl. No.: 16/143,691

(22) Filed: Sep. 27, 2018

Related U.S. Application Data

(60) Provisional application No. 62/681,964, filed on Jun. 7, 2018, provisional application No. 62/564,039, filed on Sep. 27, 2017.

(51) Int. Cl.
  *H01M 4/133* (2010.01)
  *H01M 4/13* (2010.01)
  (Continued)

(52) U.S. Cl.
  CPC ..... *H01M 10/0565* (2013.01); *H01M 4/0471* (2013.01); *H01M 4/0485* (2013.01); *H01M 4/13* (2013.01); *H01M 4/382* (2013.01); *H01M 4/5815* (2013.01); *H01M 4/621* (2013.01); *H01M 4/626* (2013.01); *H01M 4/663* (2013.01); *H01M 10/052* (2013.01); *H01M 10/058* (2013.01)

(58) Field of Classification Search
  CPC .. H01M 10/0565; H01M 4/621; H01M 4/626; H01M 4/0471; H01M 4/382; H01M 10/052; H01M 4/0485; H01M 4/13; H01M 4/663; H01M 10/058; H01M 4/5815
  See application file for complete search history.

(56) References Cited

U.S. PATENT DOCUMENTS

| | | | |
|---|---|---|---|
| 6,110,619 A * | 8/2000 | Zhang | H01M 4/602 429/213 |
| 2013/0302684 A1* | 11/2013 | Koshika | H01M 4/136 429/220 |

(Continued)

OTHER PUBLICATIONS

Manthiram et al., "Rechargeable Lithium—Sulfur Batteries", Chem. Review, vol. 114, pp. 11751-11787, Jul. 15, 2014.
(Continued)

*Primary Examiner* — Lisa S Park
(74) *Attorney, Agent, or Firm* — Dinsmore & Shohl LLP

(57) ABSTRACT

A lithium-sulfur battery cathode including conductive porous carbon particles vacuum infused with sulfur and a conductive collector substrate to which the sulfur infused porous carbon particles are deposited. The sulfur infused carbon particles are encapsulated by an encapsulation polymer, the encapsulation polymer having ionic conductivity, electronic conductivity, polysulfide affinity, or combinations thereof. A lithium-sulfur battery including the lithium-sulfur battery cathode, a lithium anode and an electrolyte disposed between the sulfur cathode and the lithium anode is also provided. Methods of producing the sulfur cathode for use in a lithium-sulfur battery by a hybrid vacuum-and-melt method are also provided.

11 Claims, 5 Drawing Sheets

(51) Int. Cl.
*H01M 4/139* (2010.01)
*H01M 4/1397* (2010.01)
*H01M 4/36* (2006.01)
*H01M 4/96* (2006.01)
*H01M 10/0565* (2010.01)
*H01M 10/052* (2010.01)
*H01M 4/38* (2006.01)
*H01M 4/58* (2010.01)
*H01M 4/04* (2006.01)
*H01M 4/62* (2006.01)
*H01M 4/66* (2006.01)
*H01M 10/058* (2010.01)

(56) References Cited

U.S. PATENT DOCUMENTS

| | | | | |
|---|---|---|---|---|
| 2014/0315100 A1* | 10/2014 | Wang | ................... | H01M 4/621 |
| | | | | 429/319 |
| 2015/0246816 A1* | 9/2015 | Liu | ................... | H01M 4/0471 |
| | | | | 216/39 |
| 2016/0308209 A1* | 10/2016 | Elam | ................... | H01M 4/587 |
| 2016/0351973 A1* | 12/2016 | Albano | ................... | H01M 4/13 |
| 2017/0141382 A1* | 5/2017 | Dadheech | ............. | H01M 4/366 |
| 2018/0241031 A1* | 8/2018 | Pan | ................... | H01M 10/054 |

OTHER PUBLICATIONS

Wang et al., "A Shuttle effect free lithium sulfur battery based on a hybrid electrolyte", Physical Chemistry Chemical Physics, Accepted Manuscript, Jan. 2013.

\* cited by examiner

LITHIUM-SULFUR BATTERY WITH HIGH SULFUR LOADING

CROSS-REFERENCE TO RELATED APPLICATIONS

This application claims priority to U.S. Provisional Application 62/564,039 filed Sep. 27, 2017 and U.S. Provisional Application 62/681,964 filed Jun. 7, 2018, both of which are incorporated by reference herein in their entirety.

STATEMENT REGARDING FEDERALLY SPONSORED RESEARCH OR DEVELOPMENT

This invention was made with U.S. Government support under Contract Numbers NNX16CC66P, and NNX17CC08C awarded by the National Aeronautics and Space Administration (NASA) and W56KGU-18-C-0003 awarded by U.S. Army to Cornerstone Research Group Inc. The U.S. Government has certain rights in the invention.

FIELD OF INVENTION

Embodiments of the present disclosure generally relate to lithium-sulfur batteries. More specifically, embodiments of the present disclosure relate to lithium-sulfur batteries having high sulfur loading and methods of making cathodes for the same.

BACKGROUND

In lithium-sulfur (Li—S) batteries, cathodes with high mass fractions of sulfur result in improved energy density and capacity. However, the overall battery performance can only be improved if the high sulfur content is incorporated effectively without impeding the current due to its insulative properties. Furthermore, current Li—S batteries have low sulfur loadings and excess liquid electrolytes with up to 60 µL liquid electrolyte per milligram of sulfur, which reduce energy density.

Conventionally, sulfur-infused cathodes are made by melting sulfur and holding at an elevated temperature for extensive time periods. For example, these periods can typically last twenty hours to allow for inflow of the melted sulfur into the carbon of the sulfur-infused cathode. Other methods for making cathodes have attempted to improve sulfur containment through the use of expensive, exotic carbon structures, such as templated mesoporous ordered carbon structures. In yet other methods, thicker cathode layers are produced to increase capacity. However, issues then arise because the sulfur in these thick layers is further from the reaction interface, is less accessible, and is not efficiently utilized. This results in parasitic weight, which decreases cell energy density.

Additionally, reduced Li—S battery performance can result from the dissolution and migration of polysulfides in the liquid electrolyte in existing lithium-sulfur batteries by the so-called "polysulfide shuttle effect." Furthermore, the liquid content adds to parasitic, non-active material weight of the cell and decrease energy density. One method to reduce polysulfide shuttling and improve energy density is to reduce the liquid electrolytes content; however such approach also restricts access to sulfur deep within thick cathodes, thus reducing the overall capacity of the battery. Therefore, some novel methods to increase sulfur loading on cathode while improving access to deep sulfur (i.e. sulfur far from the separator interface) are needed.

SUMMARY

Accordingly, a need exists for an efficient and cost-effective method for high cathode sulfur loading and reduced parasitic weight to achieve increased cathode capacity. The currently disclosed lithium-sulfur batteries and the associated method for achieving high cathode sulfur loading provide the desired improved cathode capacity. The disclosed cathode composition for utilization in a lithium-sulfur battery and the method of making such cathode accomplishes this improvement in cathode capacity by using sulfur infused LAGP ($Li_{1+x}Al_xGe_{2-x}(PO_4)_3$ where x typically equals 0.5) ceramic particles and LAGP particles that are coated with sulfur infused carbon particles. The presence of both lithium ion and electron conductors in the form of LAGP ceramic particles and carbon particles in the cathodes of the present disclosure allows thicker cathode active material layers to be fabricated with the commensurate improvement in cell energy density. This cathode structure allows lithium ions and electrons to penetrate deep into the thick cathode without being hindered by the insulating sulfur. The inclusion of LAGP within the sulfur cathodes of the disclosed lithium-sulfur batteries has been shown to impart up to a 25% improvement in cathode capacity performance.

In accordance with embodiments of the present disclosure, a lithium-sulfur battery cathode is provided. The lithium-sulfur battery cathode includes conductive porous carbon particles vacuum infused with sulfur, wherein the sulfur infused carbon particles are encapsulated by an encapsulation polymer, the encapsulation polymer having ionic conductivity, electronic conductivity, polysulfide affinity, or combinations thereof; and a conductive collector substrate to which the sulfur infused porous carbon particles are deposited.

In accordance with additional embodiments of the present disclosure, a lithium-sulfur battery is provided. The lithium-sulfur battery includes a sulfur cathode, a lithium anode, and an electrolyte disposed between the sulfur cathode and the lithium anode. The sulfur cathode includes conductive porous carbon particles vacuum infused with sulfur and a conductive collector substrate to which the sulfur infused porous carbon particles are deposited. The sulfur infused carbon particles are encapsulated by an encapsulation polymer and the encapsulation polymer has ionic conductivity, electronic conductivity, polysulfide affinity, or combinations thereof.

In accordance with another embodiment of the present disclosure, a method of producing a lithium-sulfur battery cathode by a hybrid vacuum-and-melt method is provided. The method includes ball milling conductive porous carbon particles and sulfur powder to obtain a fine powder; evacuating air from the fine powder in a reaction vessel; and heating the reaction vessel under vacuum to melt and/or vaporize the sulfur powder in the fine powder and infuse the porous carbon particles with the melted and/or vaporized sulfur to form sulfur-infused carbon particles.

In accordance with another embodiment of the present disclosure, a method of producing a lithium-sulfur battery cathode by a hybrid vacuum-and-melt method is provided. The method includes ball milling conductive porous carbon particles and sulfur powder to obtain a fine powder; evacuating air from the fine powder in a reaction vessel; heating the reaction vessel under vacuum to melt and/or vaporize the sulfur powder in the fine powder and infuse the porous carbon particles with the melted and/or vaporized sulfur to form sulfur-infused carbon particles; cooling the reaction vessel after infusion of sulfur into the carbon particles is completed; venting the reaction vessel in a reaction chamber; decanting the reaction vessel; and ball milling the sulfur-infused carbon particles to obtain a powdered sulfur cathode material.

In accordance with another embodiment of the present disclosure, a method of producing a lithium-sulfur battery cathode by a hybrid vacuum-and-melt method is provided. The method includes ball milling conductive porous carbon particles, a solid state electrolyte, and sulfur powder to obtain a fine powder; evacuating air from the fine powder in a reaction vessel; and heating the reaction vessel under vacuum to melt and/or vaporize the sulfur powder in the fine powder and infuse the porous carbon particles with the melted and/or vaporized sulfur to form sulfur-infused carbon particles.

In accordance with another embodiment of the present disclosure, a method of producing a lithium-sulfur battery cathode by a hybrid vacuum-and-melt method is provided. The method includes ball milling conductive porous carbon particles and sulfur powder to obtain a fine powder; evacuating air from the fine powder in a reaction vessel; heating the reaction vessel under vacuum to melt and/or vaporize the sulfur powder in the fine powder and infuse the porous carbon particles with the melted and/or vaporized sulfur to form sulfur-infused carbon particles; mixing the sulfur-infused porous carbon particles, a solid state electrolyte, one or more metal oxide binders, one or more polymer binders, one or more conductive additives, and a solvent in a vessel to form a homogeneous slurry, casting said slurry onto a conductive porous carbon current collector substrate; and evaporating the solvent in the cast slurry to form the lithium-sulfur battery cathode.

BRIEF DESCRIPTION OF THE DRAWINGS

The following detailed description of specific embodiments of the present disclosure can be best understood when read in conjunction with the following drawings, in which.

DETAILED DESCRIPTION

Lithium-sulfur batteries are a type of rechargeable battery known for their high specific energy. The low atomic weight of lithium and moderate atomic weight of sulfur means that lithium-sulfur batteries are relatively light compared to other battery systems that employ a metal oxides cathode and a graphite anode, yet they provide substantial energy. Specifically, a lithium-ion battery has a theoretical cathode capacity of only 250 milliamp-hours per gram (mAh/g) compared to the theoretical capacity of a sulfur cathode of 1675 mAh/g. This translates into a theoretical specific energy of 2600 watt-hours per kilogram (Wh/kg) for lithium-sulfur batteries, a vast improvement over the current specific energy of lithium-ion batteries of 225 Wh/kg. However, current commercially available lithium-sulfur battery cells only produce specific energy of 100 to 200 Wh/kg, demonstrating the wide margin available for improvement with the methods and structures of the present disclosure.

A lithium-sulfur battery works by dissolution of lithium from the anode surface during discharge and lithium plating to the anode during charging. Specifically, chemical processes representing operation of a lithium-sulfur battery cell include oxidation of lithium metal to form dissolved lithium ion from the anode surface and incorporation into alkali metal polysulfide at the cathode during battery discharge, and the battery charging process representing the opposite with lithium plating to the anode. While the lithium-sulfur battery is discharging, the formed lithium polysulfides are reduced on the cathode surface in sequence according to Equation 1. While the lithium-sulfur battery is charging, the polysulfides are formed at the cathode in sequence according to Equation 2.

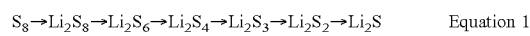

$$S_8 \rightarrow Li_2S_8 \rightarrow Li_2S_6 \rightarrow Li_2S_4 \rightarrow Li_2S_3 \rightarrow Li_2S_2 \rightarrow Li_2S \qquad \text{Equation 1}$$

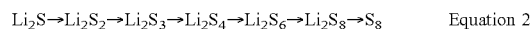

$$Li_2S \rightarrow Li_2S_2 \rightarrow Li_2S_3 \rightarrow Li_2S_4 \rightarrow Li_2S_6 \rightarrow Li_2S_8 \rightarrow S_8 \qquad \text{Equation 2}$$

Figure 1:
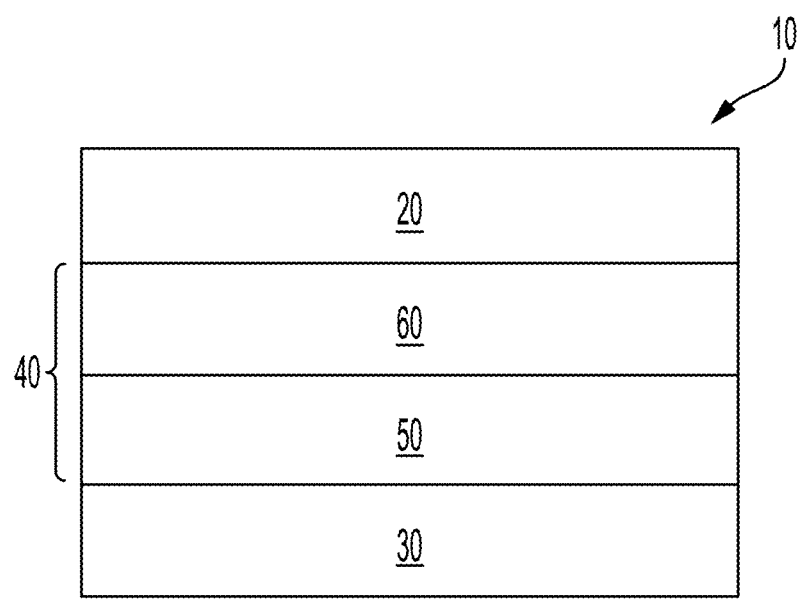
FIG. 1 is a schematic illustration of the layer structure of a lithium-sulfur battery according to one or more embodiments of the present disclosure.

Referring to the drawings in general and to FIG. 1 in particular, it will be understood that the illustrations are for the purpose of describing a particular embodiment of the present disclosure and are not intended to be limiting thereto. A lithium-sulfur battery 10 comprises a sulfur cathode 20, a lithium anode 30, and a hybrid electrolyte 40 disposed between the sulfur cathode 20 and the lithium anode 30. The sulfur cathode 20 comprises a solid lithium ion conductor and conductive porous carbon infused with sulfur. The hybrid electrolyte 40 comprises at least one electrolyte layer 50 and at least one polysulfides blocking barrier layer 60.

A sulfur cathode of a lithium-sulfur battery should create a triple point that brings together cathode active materials (sulfur), anode ions (Li$^+$), and electrons to a reaction site for power generation. The disclosed sulfur cathode 20, the composition of the sulfur cathode 20, and the method of making the sulfur cathode 20 accomplishes such a triple point by bringing together sulfur, lithium ions, and electrons using a solid ion conductor in combination with sulfur infused carbon particles. The presence of both lithium ion and electron conductors in the cathode by using a combination of the solid ion conductor, the carbon particles, and the infused sulfur in close proximity to each other allows a thicker and yet ion conductive cathode to be fabricated. Thicker active sulfur cathode 20 are beneficial as it increases the weight proportion of active energy generating materials in the battery cell versus other passive material, resulting in improvement of the battery cell's specific energy density. Specifically, the combination of the solid ion conductor and the conductive carbon particles allows ions and electrons to penetrate deeper into the sulfur cathode 20 without being hindered by the insulating properties of sulfur.

The sulfur cathode 20 comprises sulfur infused conductive carbon particles. In one or more embodiments, the conductive porous carbon of the sulfur cathode 20 is infused with sulfur to a loading of 35 to 85 weight percent (wt. %) sulfur. In various further embodiments, the porous carbon of the sulfur cathode 20 is infused with sulfur to a loading of 50 to 85 wt. %, 50 to 80 wt. %, 55 to 75 wt. %, or 60 to 85 wt. %.

The sulfur cathode 20 may comprise one or more types of conductive porous carbon. In one or more embodiments, the sulfur cathode 20 may comprise a conductive carbon black. Specific examples of carbon black which may be utilized in various embodiments include TIMCAL SUPER C45, C-NERGY™ and Super P® carbon blacks from Imerys Graphite & Carbon, and Ketjenblack from AkzoNobel. In various embodiments, the conductive porous carbon may have a porosity of 60 to 90 percent by volume, 65 to 85 percent by volume, or 70 to 80 percent by volume.

The solid ion conductor provides a conduction pathway for lithium ions throughout the thickness of the sulfur cathode 20. In one or more embodiments the solid ion conductor comprises a solid-state electrolyte powder. Generally, a solid-state electrolyte powder is defined as a solid powder that allows mobility of the conducting ionic species throughout the solid medium. For purposes of this disclosure, a solid-state electrolyte powder may be a solid that has high mobility of an ionic species. In one or more embodiments, the solid-state electrolyte powder may comprise $Li_{1+x}Al_xGe_{2-x}(PO_4)_3$ where x typically equals 0.5 (LAGP). In various further embodiments, the solid ion conductor may comprise lithium lanthanum zirconate (LLZO), including but not limited to aluminum doped lithium lanthanum zirconate (Al-doped LLZO), niobium doped lithium lanthanum zirconate (Nb-doped LLZO), tantalum doped lithium lanthanum zirconate (Ta-doped LLZO), lithium aluminum titanium phosphate (LATP), lithium tin phosphorous sulfide, or inorganic sulfide glasses ($Li_2S-P_2S_5$). Throughout this disclosure, reference will be made specifically to LAGP for clarity and conciseness, but it will be appreciated that the other disclosed solid ion conductors and solid-state electrolyte powders may also be utilized.

The LAGP may be provided for incorporation into the sulfur cathode 20 as a fine powder. The LAGP provides a greater surface area for electrochemical reaction and adsorption of sulfur, thus allowing more efficient use of the lithium ion reservoir in the cathode. It will be appreciated that lithium is typically present in excess in the battery cell and its utilization depends on the amount of accessible sulfur that participates in the electrochemical reaction. The incorporation of fine powder of LAGP into the sulfur cathode 20 also allows better access of the active material (i.e. sulfur) for electrochemical reaction throughout the sulfur cathode 20. In various embodiments, the LAGP is ground or reduced to a powder having an average particle size of less than 5 micrometers (μm), less than 2 μm, less than 1 μm, and less than 0.5 μm.

In one or more embodiments, the sulfur cathode 20 may comprise to 1 to 30 wt. % of LAGP. In various further embodiments, the sulfur cathode 20 may comprise 2 to 30 wt. % of LAGP, 2 to 25 wt. % of LAGP, 2 to 20 wt. % of LAGP, and 5 to 20 wt. % of LAGP.

Figure 2A:
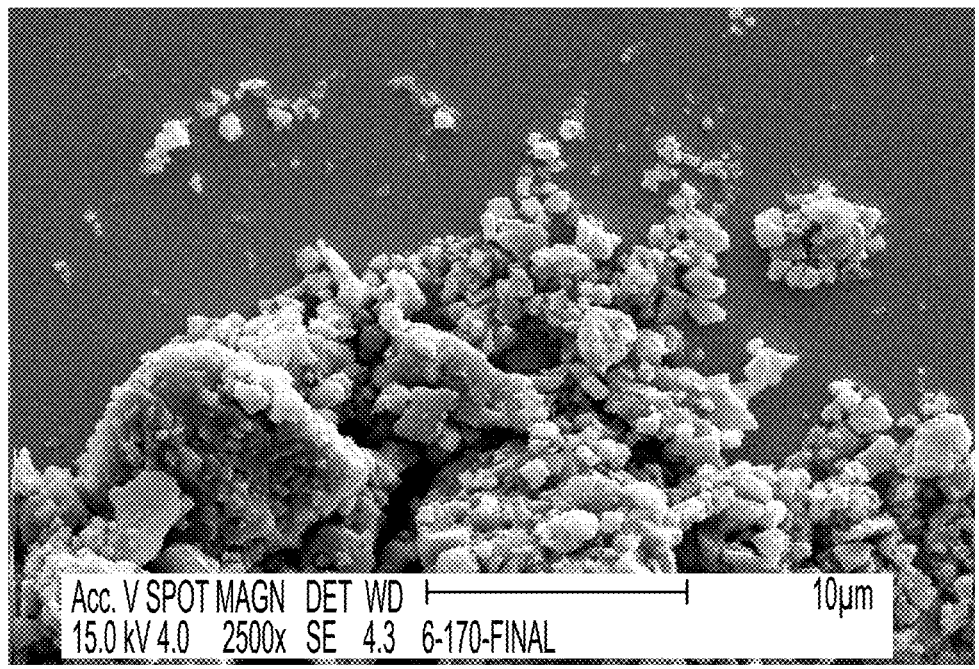
FIG. 2A is a scanning electron microscopy (SEM) image of LAGP surface microstructure and porosity.
Figure 2B:
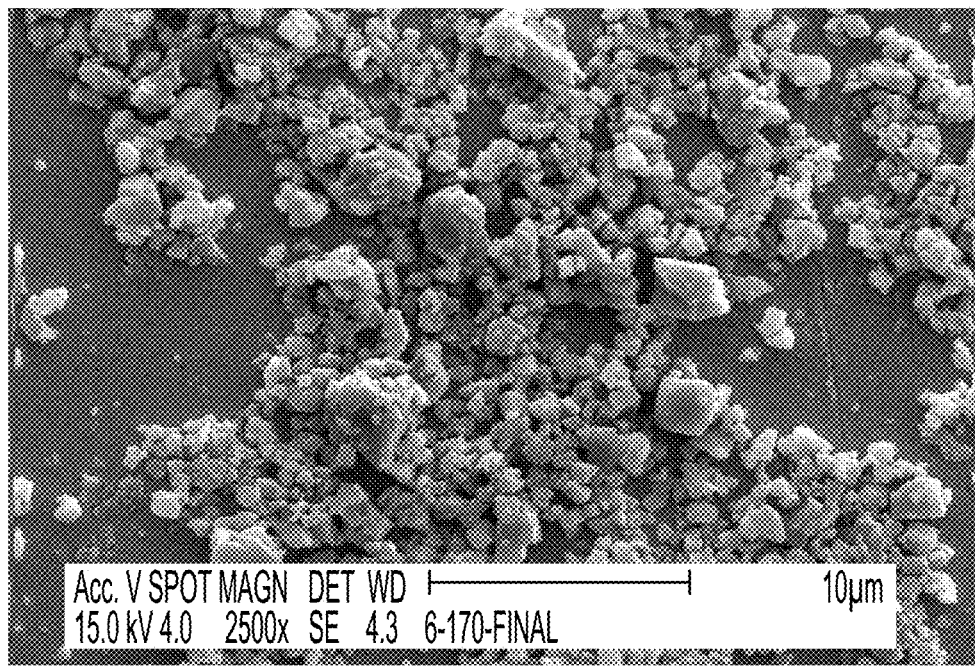
FIG. 2B is a scanning electron microscopy (SEM) image of LAGP surface microstructure and porosity.

The surface microstructure of the LAGP may be tuned by tailoring processing temperature, crystal growth time and quenching time that are known to those skilled in the art to comprise varying porosity and texture. Varying the porosity of the LAGP, the texture of the LAGP, or both can achieve differing levels of sulfur entrapment and prevalence of reactive surface areas. With reference to FIGS. 2A and 2B, scanning electron microscopy (SEM) images illustrate the tunable LAGP surface microstructure and porosity. Porosity may be determined by BET (Brunauer-Emmett-Teller) analysis and surface texture may be determined by scanning electron microscopy.

In one or more embodiments, the LAGP disposed within the sulfur cathode 20 may be infused with sulfur. Specifically, sulfur may be infused into cracks and the porosity of the LAGP microstructure.

To further improve the capacity and performance of the sulfur cathode 20, carbon particles with high surface area is desirable. For purposes of this disclosure, a high surface area is considered to be a surface area greater than 40 square meters per gram ($m^2/g$). The high surface area provides more area per unit weight of cathode for electrochemical reaction and adsorption of sulfur, thus allowing more efficient use of the sulfur reservoir in the sulfur cathode 20. Conductive porous carbon, such as the Super P and Ketjenblack, has high surface area ranging from 45 $m^2/g$ to 1400 $m^2/g$. For example, Super P is considered to have a surface area of approximately 62 $m^2/g$. However, the high surface area of the conductive porous carbon particles introduces challenges associated with binding the conductive porous carbon particles into a strong, cohesive cathode film to form the sulfur cathode 20. To overcome these challenges in forming a mechanically stable sulfur cathode, in one or more embodiments, the porous carbon particles are clustered or partially bound together before sulfur infusion. Such clustering of carbon particles may be accomplished through solution polymerization of a binder and carbonization of the resulting polymer network around the porous carbon particles. The resulting polymer network may undergo carbonization through heat treatment at temperatures in excess of 800° C. under inert conditions. For example, carbonization may be completed with heat treatment at a temperature of approximately 800° C. under an argon (Ar) blanket. It will be appreciated that solution polymerization to cluster the porous carbon particles may be accomplished with polyesterification of citric acid with ethylene glycol. Polyesterification of citric acid with ethylene glycol generally involves mechanically mixing of the constituents at 60° C. in water for 2 hours followed by continued mixing in conjunction with a temperature increase to 130° C. and hold for 6 hour.

The infusion of sulfur into the pores of the solid ion conductor (LAGP) and conductive porous carbon of the sulfur cathode 20 alleviates polysulfide shuttling and improves access to solid sulfur for electrochemical reaction in lithium sulfur batteries. However, the elevated loading of sulfur present in the constituents of the sulfur cathode 20 may result in some sulfur in the pores of the LAGP and porous carbon dissolving into the electrolyte without precautionary interference. The dissolution of the lithium polysulfides into the electrolyte could result in polysulfide shuttling. In order to reduce polysulfide shuttling, in one or more embodiments, the solid ion conductor and porous carbon infused with sulfur are encapsulated by an encapsulation polymer. The term encapsulation as used herein means that the infused porous carbon particles are bound together via formation of some degree of polymer coating on the particles' surface. The encapsulation polymer provides trapping and restriction of the sulfur in the pores of the solid ion conductor and porous carbon from leaching into the electrolyte. The encapsulation polymer may provide ionic conductivity, electronic conductivity, polysulfide affinity, or combinations thereof while blocking migration of polysulfides. In a variety of embodiments polymer electrolyte materials and semiconducting polymers like polyethylene oxide, polypropylene oxide, polypropylene carbonate, polyvinyl acetate, polyvinylpyrrolidone (PVP), polydimethylsiloxane-co-polyethylene oxide, polypyrrole, polyanilines, polyethylenedioxythiophene (PEDOT), polyacetylene, polyphenylene vinylene, or other copolymers or blends of these materials are provided as the encapsulation polymer.

In one or more embodiments, ceramic additives may be added to the sulfur cathode 20 to enhance lithium polysulfides adsorption. Enhanced lithium polysulfide adsorption may result in improved lithium-sulfur battery 10 performance. Specifically, enhanced lithium polysulfide adsorption keeps the soluble polysulfide close to the sulfur cathode 20 and thus available for further lithiation or reduction during the electrochemical reaction. Maintaining availability of the polysulfides for further lithiation maximizes the capacity of the cell. If the soluble and reducible polysulfide is allowed to dissolve away from the sulfur cathode 20 and migrate towards the lithium anode 30 via polysulfide shuttling, less reducible polysulfide is available at the sulfur cathode 20 to receive the electron coming from the lithium anode 30 through the circuit. Thus, resulting in lower current and also reduced capacity. The ceramic additives integrated into the sulfur cathode 20 should have a porosity and chemical affinity optimized to adsorb or absorb lithium polysulfides. Such ceramic additives may include metal oxides. In one or more embodiments, the metal oxides incorporated into the sulfur cathode 20 as the ceramic additive may include one or more of alumina ($Al_2O_3$), silica ($SiO_2$), titania ($TiO_2$), vanadia ($V_2O_5$), and $Mg_{0.6}Ni_{0.4}O$. Additionally, in one or more embodiments, the ceramic additives may comprise a porosity in the mesoscale of 100 nanometers (nm) to 1000 nm.

In various embodiments the lithium anode 30 comprises lithium metal foil, lithium clad copper foil, and lithium sputter-coated copper foil. It will be appreciated that the lithium anode 30 may be formed in accordance with the anode of lithium-sulfur batteries known to those skilled in the art.

In one embodiment, a hybrid electrolyte 40 is disposed between the sulfur cathode 20 and the lithium anode 30. The hybrid electrolyte 40 is formed from at least two layer comprising at least one electrolyte layer 50 and at least one polysulfides blocking barrier layer 60. The electrolyte layer 50 allows the flow of ions between the sulfur cathode 20 and lithium anode 30 during charging and discharging of the lithium sulfur battery 10. Specifically, the electrolyte layer 50 plays a key role in transporting the positive lithium ions between the sulfur cathode 20 and lithium anode 30. The polysulfides blocking layer 60 serves to keep the reducible and lithiated polysulfides on the sulfur cathode 30 and prevent polysulfides from reacting at the lithium anode 30.

The electrolyte layer 50 may comprise a variety of liquid electrolytes known to those skilled in the field of lithium sulfur batteries. The electrolyte layer 50 should be selected to enable mobility of the ion to move between electrodes, not react with the lithium metal anode 30, and dissolve the binder of the sulfur cathode 30. Additionally, the electrolyte layer 50 should be selected to provide voltage stability within the battery operating voltage by not decomposing under the operating voltage. In one or more embodiments, the electrolyte layer 50 may comprise LiTFSI:DOL:DME electrolyte, where LiTFSI is lithium bis(trifluoromethanesulfonyl)imide and has a concentration of 1M (one molar) in a blended solvent of DOL (1,3-dioxolane) and DME (dimethoxyethane) in a volume ratio of 1 to 1.

The polysulfides blocking barrier layer 60 prevents polysulfides from reacting at the lithium anode. Traditionally, solid electrolyte barriers have been utilized in the form of ceramic plates, however they are dense and difficult to process into thin flexible sheets as preferred for practical cell fabrication. A thin conformal barrier layer with ease of fabrication in accordance with the polysulfides blocking barrier layer 60 of the present disclosure alleviates drawbacks of traditional solid electrolyte barriers. According to one or more embodiments, the polysulfides blocking barrier layer 60 comprises a polymer ceramic composite electrolyte (CPCE) formed from a ceramic ion conductor and a polymer ion conductor. The ceramic particles in the CPCE provides lithium ion mobility and enhanced barrier properties to polysulfides while the polymer components provide conformability and lithium ion mobility, resulting in good performance as polysulfides blocking barrier layer. The CPCE may be utilized used to create a thin layer of less than 50 μm to act as a barrier to polysulfides reaching the lithium anode 30. In a variety of further embodiments, the polysulfides blocking barrier layer 60 may be formed as a thin layer of less than 35 μm, less than 20 μm, and less than 10 μm in thickness. The minimal layer thickness of the polysulfides blocking barrier layer 60 provides flexibility of the CPCE sheet as is beneficial for cell fabrication.

A variety of polymer and ceramic electrolytes can be used to form the CPCE barrier material of the polysulfides blocking barrier layer 60. In a variety of embodiments, the ceramic ion conductors used in the CPCE may include lithium aluminum germanium phosphate (LAGP), aluminum doped lithium lanthanum zirconate (Al-doped LLZO), lithium aluminum titanium phosphate (LATP), and lithium tin phosphorous sulfide. Further, polymer ion conductors used in the CPCE may include polyethylene oxide, polypropylene oxide, polypropylene carbonate, polyvinyl acetate, polyvinylpyrrolidone, polydimethylsiloxane-co-polyethylene oxide, and combinations thereof. The polymer ion conductors may be crosslinked into a thermoset or gel matrix or left as an uncrosslinked thermoplastic form.

It will be appreciated that in one or more embodiments the CPCE of the polysulfides blocking barrier layer 60 may be supported on traditional porous separator substrates to achieve a thin layer. Supporting substrates for a thin CPCE layer may include a Celgard porous polymer separator, porous polymer films, glass fiber mats, and ceramic coated versions of porous polymer separator membranes.

In one or more embodiments, the polysulfides blocking layer 60 is positioned between the lithium anode 30 and the sulfur cathode 20. In further embodiments, the polysulfides blocking layer 60 may be combined with liquid electrolytes on either side or both sides of the polysulfides blocking layer 60.

In one or more embodiments, the lithium-sulfur battery 10 may comprise a solid state electrolyte formed from a $Li_{1+x}Al_xGe_{2-x}(PO_4)_3$ where x typically equals 0.5 (LAGP) ceramic electrolyte plate which concurrently provides the at least one electrolyte layer and the at least one polysulfides blocking barrier layer. LAGP is a solid lithium ion conductor and has the ability to suppress dendrite formation and sulfur cross-over from the sulfur cathode 20 to the lithium anode 30 resulting in increased battery cycles and capacity. Additionally, the high ionic conductivity of LAGP for lithium of approximately $10^{-2}$ S/cm at room temperature makes LAGP an excellent electrolyte.

In one or more embodiments with a LAGP solid state electrolyte, the LAGP is provided as a ceramic electrolyte plate and is combined with an anode and cathode interface material to enhance the contact between these surfaces. The contact between the sulfur cathode 20 and the LAGP enhanced with the cathode interface material and the contact between the lithium anode 30 and the LAGP enhanced with the anode interface material forms a stable solid electrolyte interphase (SEI) layer and increased ion conduction. The anode and cathode interface material is positioned between the electrolyte layer 50 and the lithium anode 30 and/or sulfur cathode 20. In various embodiments, the anode and cathode interface material may be provided as a conformal solid, liquid, or gel. For example, the anode and cathode interface material may comprise polyelectrolyte gel or conformal ion conductive gel electrolyte.

Figure 3:
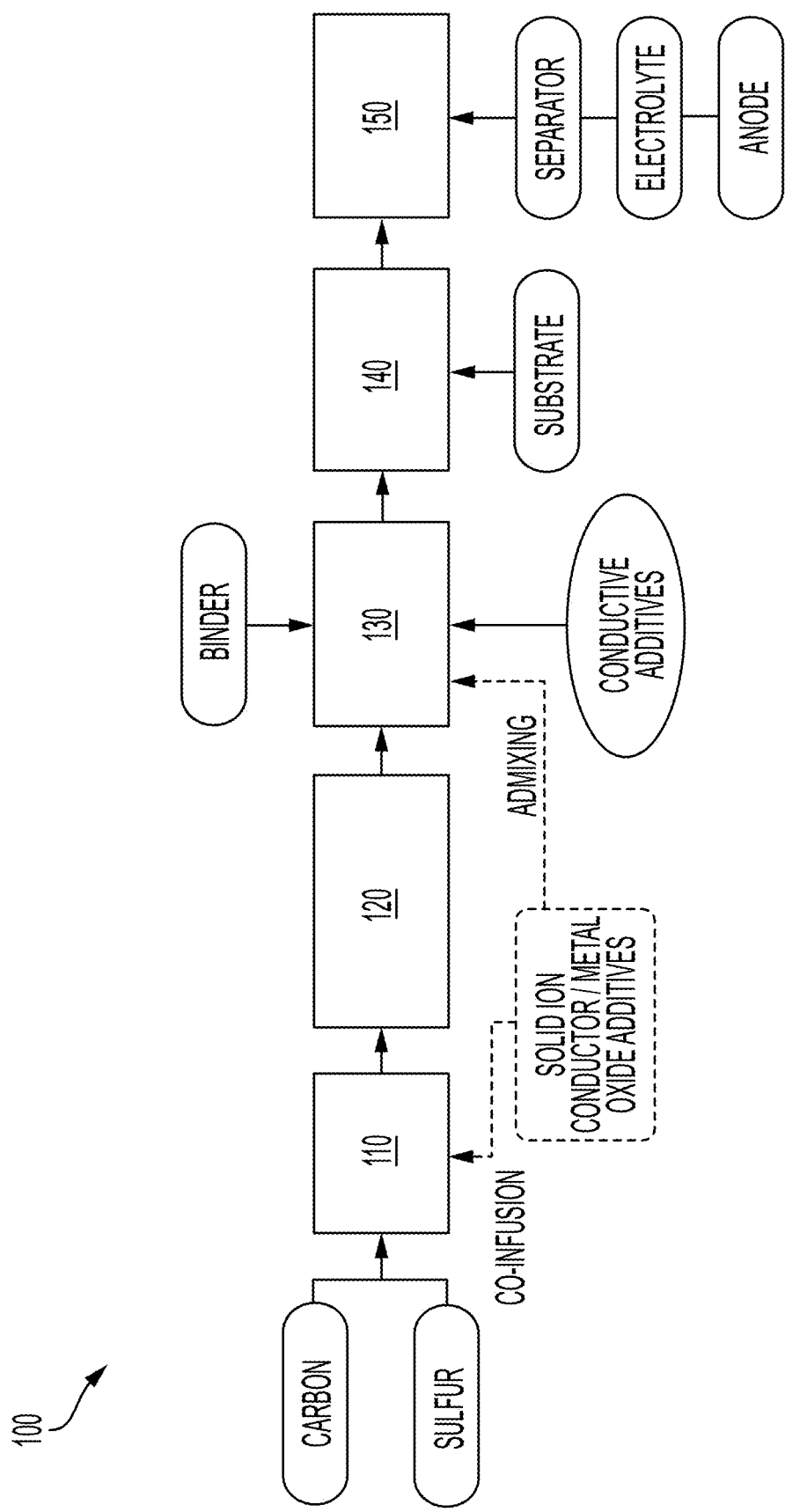
FIG. 3 is a flow diagram of lithium-sulfur battery fabrication according to one or more embodiments of the present disclosure.

Having discussed the constituent components of the lithium-sulfur battery 10, methods of producing the same will be addressed. With reference to FIG. 3, a flow diagram is provided delineating various steps in the fabrication of the lithium-sulfur battery 10. In one or more embodiments, the fabrication process 100 of the lithium-sulfur battery 10 comprises a sulfur infusion step 110, an encapsulation step 120, a cathode formulation and mixing step 130, a cathode casting and drying step 140, and a battery cell assembly step 150.

The sulfur infusion step 110 comprises infusing elemental sulfur into the porous carbon used to form the sulfur cathode 20. In one or more embodiments, the sulfur infusion step 110 includes a process for sulfur infusion which results in better sulfur entrapment within carbon particles than prior methods. It may be shown that the process for sulfur infusion results in reduced polysulfide shuttling (PS) and increased cathode capacity from the greater and more stable sulfur loading. The sulfur infusion step 110 comprises a hybrid vacuum-and-melt method for sulfur infusion. Initially conductive porous carbon particles and sulfur powder is ball milled to obtain a fine powder. Generally, a size less than 75 µm is considered a fine powder for purposes of this disclosure. A sieve with 200 mesh screen size, for example, may be utilized to sieve the fine powder and segregate larger sized particles. In various embodiments, the ball milling process may be continued for 15 minutes (min) to 3 hours (h), 15 min to 2 h, 15 min to 1 h, and 30 min to 1 h with ⅛" steel ball or other appropriate media to intimately mix and homogenize the resulting powder mixture.

It will be appreciated that the porous carbon particles and sulfur powder may be provided to the ball milling process according to various formulations. For example, the porous carbon may comprise a mixture of one or more different and distinct porous carbon particles including a combination of Super P [SP] and Ketjenblack [KB] in combination with elemental sulfur. The ratio of carbon:sulfur added to the ball mill may be 1:1 to 1:5.7 to achieve the previously indicated 50% to 85% loading of sulfur. In various further embodiments, the ratio of carbon to sulfur added to the ball mill may be adjusted to achieve a loading of 50 to 85 wt. %, 50 to 80 wt. %, 55 to 75 wt. %, or 60 to 85 wt. If the sulfur loading is too great, the carbon surface becomes saturated and excess sulfur may result in the sulfur cathode 30 becoming more insulative and hence lowering cell efficiency. If the sulfur loading is not maximized then the cell's capacity as a result is also not maximized. In one or more embodiments, LAGP or other solid ion conductor powder may be provided to the ball milling process in combination with the porous carbon and sulfur. Inclusion of LAGP with the porous carbon and sulfur allows for sulfur infusion of the LAGP in addition to the porous carbon. The LAGP provided to the ball bill may be adjusted to result in a in a loading in the total mixture of from 0 to 20 wt. %.

Subsequently, the ball milled mixture of porous carbon, sulfur, and optionally LAGP is charged into a reaction vessel to infuse the sulfur into the porous carbon and LAGP. In one or more embodiments, air is evacuated from the fine powder in the reaction vessel. Specifically, the reaction vessel may be fluidly connected to a vacuum pump or other evacuation device to evacuate air from the reaction vessel. In various embodiments, the achieved vacuum of less than 150 mtorr, less than 120 mtorr, less than 100 mtorr, less than 80 mtorr, or less than 30 mtorr is held for a period of 30 min to 3 h, 30 min to 2 h, 45 min to 1.5 h, or approximately 1 hr. Maintaining the vacuum in the reaction vessel for a sustained period provides an opportunity to maximize removal of entrapped air within the pores and cracks of the porous carbon and LAGP.

After evacuating air from the fine powder in the reaction vessel, the reaction vessel is then heated while maintaining the vacuum. In one or more embodiments, the method includes heating the reaction vessel under vacuum to melt the sulfur powder in the fine powder and infuse the porous carbon particles with the melted sulfur to form sulfur-infused carbon particles. The heating may include an initial heating step to an initial temperature of 50° C. to 95° C., 50° C. to 100° C., 50° C. to 110° C., or 50° C. to 115° C., for example, at which point, the reaction vessel is sealed and heated further to a greater second temperature to melt and vaporize the sulfur under reduced pressure. In various embodiments, the second temperature may be 95° C. to 158° C., 95° C. to 155° C., 115° C. to 158° C., 115° C. to 155° C., 120° C. to 155° C., or approximately 155° C. The second temperature is maintained below 159° C., at which point the sulfur may begin to polymerize. The sealed reaction vessel may be sustained at the second temperature for 10 min to 3 h, 30 min to 3 h, 30 min to 2 h, 45 min to 1.5 h, or approximately 1 hr. Holding the reaction vessel at the second temperature provides a period for melting and vaporization of the vaporizing sulfur under vacuum and allows the melted and/or vaporized sulfur to infuse into the pores and cracks vacated of air from the application of a vacuum.

In one or more embodiments, after heating the reaction vessel to melt and vaporize the sulfur, the method may further include cooling the reaction vessel, venting the reaction vessel, decanting the reaction vessel, and ball milling the sulfur-infused carbon particles to obtain a powdered sulfur infused cathode material. In various embodiments, the ball milling process may be continued for 15 minutes (min) to 3 hours (h), 15 min to 2 h, 15 min to 1 h, and 30 min to 1 h with ⅛" steel ball or other appropriate media to intimately mix and homogenize and break up clumps of the resulting powder mixture. The sulfur content of the powdered sulfur cathode material may be confirmed with thermogravimetric analysis (TGA).

The encapsulation step 120 provides the encapsulation polymer around the porous carbon infused with sulfur. The encapsulation polymer may be applied by using water or other solvent for the constituent components of the encapsulation polymer and then drying a mixture of the porous carbon infused with sulfur and the dissolved encapsulation polymer. Drying may be achieved by holding the material at 30° C. and 20% RH for approximately 24 hours and then proceeding to dry at an elevated temperature of 50° C., for example, for approximately 12 hours. Other techniques to coat and dry the porous carbon infused with sulfur with encapsulation polymer include spray drying and freeze spray drying.

The cathode formulation and mixing step 130 prepares the final formulation for the sulfur cathode 20. In one or more embodiments, the cathode formulation and mixing step 130 includes mixing the sulfur-infused porous carbon particles, a conductive additive, one or more metal oxide additives, polymer binders (examples: polyethylene oxide (PEO), polypropylene oxide (PPO), polyvinylpyrrolidone (PVP), polyvinylidene difluoride (PVDF), CMCSBR (carboxymethylcellulose styrene-butadiene rubber)), and a solvent in a vessel to form a homogeneous slurry of cathode material. The components may be stirred with a magnetic stirrer in a reaction vessel or in a planetary vacuum mixer at room temperature until it forms a homogeneous slurry of cathode material. In various embodiments, the conductive additive may comprise $Li_{1+x}Al_xGe_{2-x}(PO_4)_3$ where x typically equals 0.5 (LAGP), multi-wall carbon nanotube (MWCNT), or LATP, Al-doped LLZO. In one or more embodiments, the solvent may comprise or consist of N-methyl-2-pyrrolidone (NMP).

The final formulation for the homogeneous slurry of cathode material may comprise sulfur infused carbon at 60 to 90 wt. %, conductive additives at 0 to 20 wt. %, oxide additives at 0 to 10 wt. %), polymer binder at 5 to 15 wt. % and solvent in excess to achieve 100 cP to 1000 cP viscosity.

The cathode casting and drying step 140 forms the sulfur infused porous carbon into a solid sulfur cathode 20. In one or more embodiments, the homogenous slurry is formed into a cake and the solvent is removed in a drying process to form the solid structure of the sulfur cathode 20. In one or more embodiments excess NMP as the solvent may be provided to control slurry viscosity to 100 to 1000 cP with the casting completed at room temperature. Subsequently, the cast sulfur cathode 20 may be allowed to dry for approximately 12 to 24 hours or until dried. The thickness of cast slurry may be approximately 200 to 600 μm before drying controlled by a doctor-blade process, and may shrink approximately up to 90% upon drying. In one or more embodiments, thickness of cast slurry may be approximately 400 μm.

The cathode casting and drying step 140 may also include a substrate onto which the homogeneous slurry is cast. In one embodiment, a conductive aluminum foil substrate may be used for the casting. In one or more embodiments, a porous, conductive carbon current collector may be used as the substrate to improved cathode deposition. The texture of the substrate with surface roughness as well as capillary wicking of cathode slurry solvent by the porosity of the substrate assists in adherence and densification of the deposited cathode films. Further, the presence of a porous substrate increases areal loading of active materials in the finished dried sulfur cathode 20. In various embodiments, the porous carbon current collector substrate may include carbon nanofoam paper commercially available, for example, from Marketech International; carbon fiber paper such as a graphitized gas diffusion layer such as Spectracarb; activated carbon sheet; and carbon fiber veil.

Having formed the sulfur cathode 20 in accordance with the present disclosure, a final lithium-sulfur battery cell 10 may be assembled. In the cell assembly step 150, the lithium-sulfur battery 10 is assembled as an operational cell. In one or more embodiments, the sulfur cathode 20 is mated with a lithium anode 30 with a hybrid electrolyte 40 disposed between. It will be appreciated that stacking of the layers of the lithium-sulfur battery 10 may be adjusted in conformity with the various embodiments disclosed throughout the present disclosure.

Examples

Sulfur infused porous carbon and lithium-sulfur batteries were prepared in accordance with embodiments of the present disclosure to demonstrate the improved performance of the disclosed methods and resulting batteries.

Sulfur was infused into porous carbon using a variety of initial porous carbon particles. Specifically, porous carbon and sulfur at the prescribed weight percentage of sulfur were ball milled for 0.5 h with ⅛" steel ball media to intimately mix and homogenize the resulting mixture. The resulting homogenized mixture was charged into a reaction vessel capable of withstanding heat and vacuum. The reaction vessel was connected to a vacuum pump and evacuated for 1 hour after achieving a pressure of less than 100 mtorr. The reaction vessel was then heated to 110° C. while maintaining vacuum, at which point, the reaction vessel was sealed and heated further to 155° C. to melt and vaporize the sulfur for a period 1 hour. Upon cooling, the reaction chamber was vented and its contents were decanted. The infused product comprising sulfur infused porous carbon was then ball milled for 0.5 hours with ⅛" steel ball media to homogenize the material. Sulfur infused porous carbon samples with a nominal sulfur content of 37.5 wt. %, 56.25 wt. %, and 75 wt. % were prepared for sulfur infused Super P carbon and sulfur infused porous carbon samples with a nominal sulfur content of 37.5 wt. %, 56.25 wt. %, 75 wt. %, and 85 wt. % were prepared for sulfur infused Ketjenblack carbon. The sulfur infused Super P is delineated by the notation "SP:S" and the sulfur infused Ketjenblack is delineated by the notation "KB:S".

The true sulfur content of the experimentally produced porous carbon samples were confirmed by thermogravimetric analysis (TGA) to show a loading up to 85% by weight. The hybrid vacuum-and-melt infusion method demonstrates successful high sulfur loading of from greater than 50% to approximately 85% in a fraction of the time necessary for conventional melt only infusion methods. The presently disclosed hybrid vacuum-and-melt infusion method demonstrates successful high sulfur loading in a time of approximately 1 hour compared to conventional melt only infusion methods requiring approximately 20 to 24 hours. Additionally, the presently disclosed hybrid vacuum-and-melt infusion method results in sulfur infusion into the carbon and effectively fills all the carbon porosity compared to conventional melt infusion techniques which mostly just coats the outside of the carbon particles. High sulfur loading using conventional melt infusion techniques harms cell performance because of the insulative properties of sulfur and coating of the outside of the carbon particles. A comparison of the nominal S content and the actual sulfur content as determined by TGA for samples of sulfur infused Super P and sulfur infused Ketjenblack prepared according to methods of the present disclosure are provided in Table 1. Each sample was prepared as a 10 gram (g) batch.

TABLE 1

| Nominal Sulfur Content (wt. %) | Super P Sulfur Content (wt. %) | Ketjenblack Sulfur Content (wt. %) |
| --- | --- | --- |
| 37.5 | 37.0 | 35.7 |
| 56.25 | 54.9 | 56.2 |
| 75 | 70.3 | 74.8 |
| 85 | | 82.6 |

Testing was also completed to demonstrate the scalability of the sulfur infused porous carbon production methods. Specifically, a benchtop scale batch of 10 grams (g) was prepared in a bench reactor and a comparative batch of scaled batches of 100 g was prepared in a larger reactor using Ketjenblack, each batch having a nominal sulfur content of 75 Wt. %. The resulting comparative data showing substantially the same actual infused sulfur content as measured by TGA is presented in Table 2.

TABLE 2

| Batch Size (g) | Carbon Material | Nominal Sulfur Content (wt. %) | TGA Measured Sulfur Content (wt. %) |
|---|---|---|---|
| 100 g (scaled reactor) | Ketjenblack | 75 | 74.6 |
| 10 g (bench reactor) | Ketjenblack | 75 | 74.8 |

In accordance with further embodiments of the present disclosure, sulfur infused carbon was prepared in combination with sulfur infused LAGP. Specifically, porous carbon and sulfur at the prescribed weight percentage of sulfur in addition to LAGP powder were ball milled for 0.5 h with ⅛" steel ball media to intimately mix and homogenize the resulting mixture. The resulting homogenized mixture was charged into a reaction vessel and completed in accordance with the same procedure outlined above for the samples without LAGP. The sulfur infused Super P in combination with LAGP is delineated by the notation "SP:S:LAGP" and the sulfur infused Ketjenblack in combination with LAGP is delineated by the notation "KB:S:LAGP".

Utilizing the generated sulfur infused carbon samples (SP:S, KB:S, SP:S:LAGP, and KB:S:LAGP), sulfur cathodes were formed. Specifically, sulfur cathodes were formed by providing excess NMP as the solvent to each sulfur infused carbon sample to form a slurry having a viscosity of 100 to 1000 cP. Subsequently the slurry was cast at room temperature onto a carbon-coated aluminum foil substrate (MTI Corporation) and allowed to dry overnight. No encapsulation was completed for the prepared sulfur cathode samples. The formed sulfur cathodes were then assembled into operational lithium-sulfur batteries. Specifically, sulfur batteries were assembled with a solid lithium anode, a solid ceramic electrolyte surrounded by liquid electrolyte, and the various formed sulfur cathodes. Specifically, LiTFSI-DOL-DME; and a LAGP electrolyte plate were combined with the solid lithium anode and each prepared sulfur cathode to form sulfur batteries for comparison.

Figure 4:
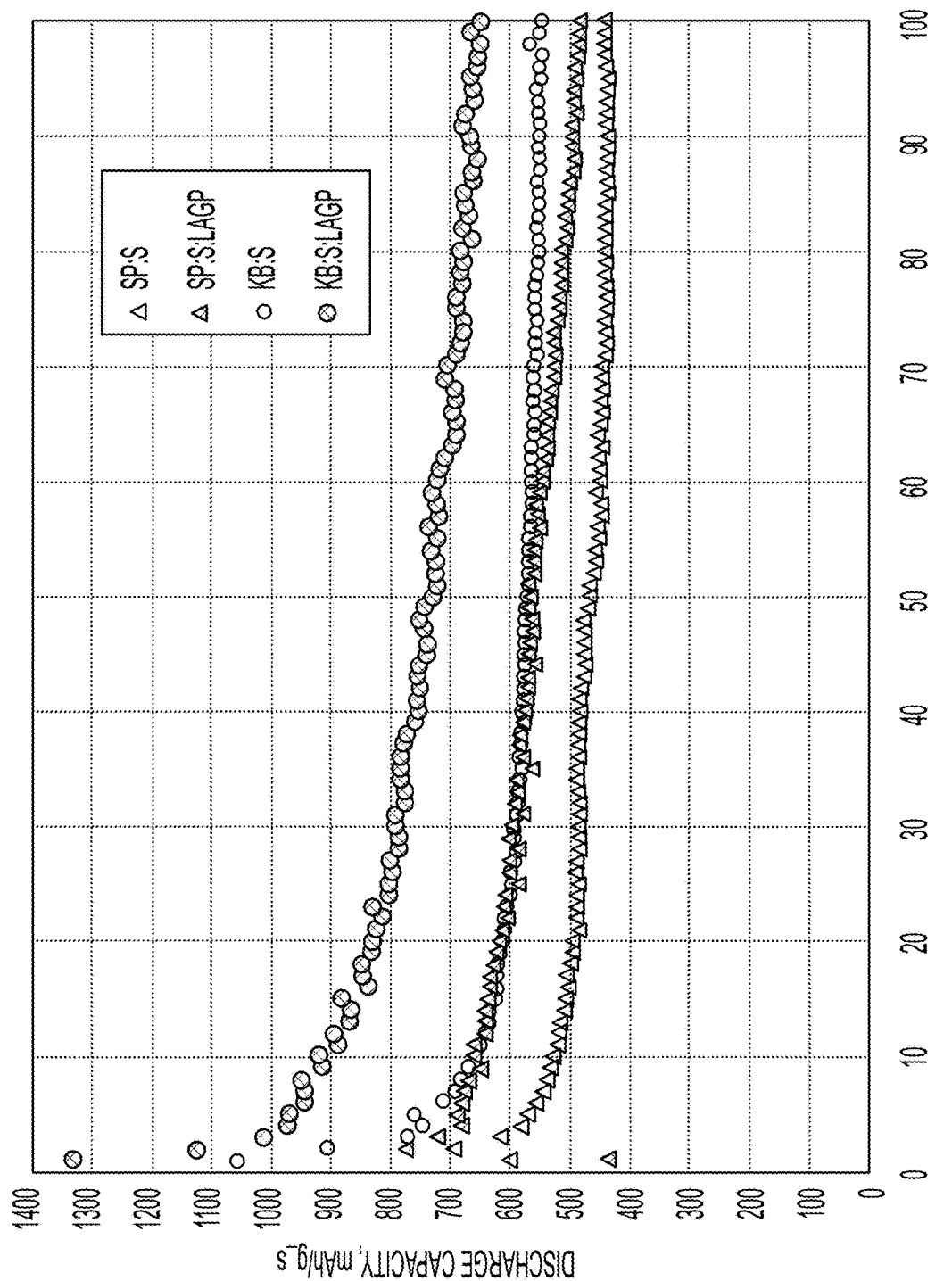
FIG. 4 is a graph showing increased discharge capacity of lithium-sulfur batteries with inclusion of LAGP within the sulfur cathode formulation.

With reference to FIG. 4, testing of lithium-sulfur batteries comprising sulfur cathodes formed from Ketjenblack with and without LAGP or formed from Super P with and without LAGP was completed to determine discharge capacity over repeated charge/discharge cycles. Specifically, lithium-sulfur batteries were prepared with the same anode and electrolyte layers and differing sulfur cathodes to provide a direct comparison of the effect of the sulfur cathode. The inclusion of LAGP in the sulfur cathode demonstrated a consistent marked improvement in the discharge capacity over repeated discharge cycles compared to the corresponding sulfur cathode without LAGP. Super P with LAGP (SP:S:LAGP) results in a 12 to 24% increase in discharge capacity over the range of discharge cycles when compared to Super P without LAGP (SP:S). A similar increase is demonstrated when Ketjenblack with LAGP (KB:S:LAGP) is compared with Ketjenblack without LAGP (KB:S).

Figure 5:
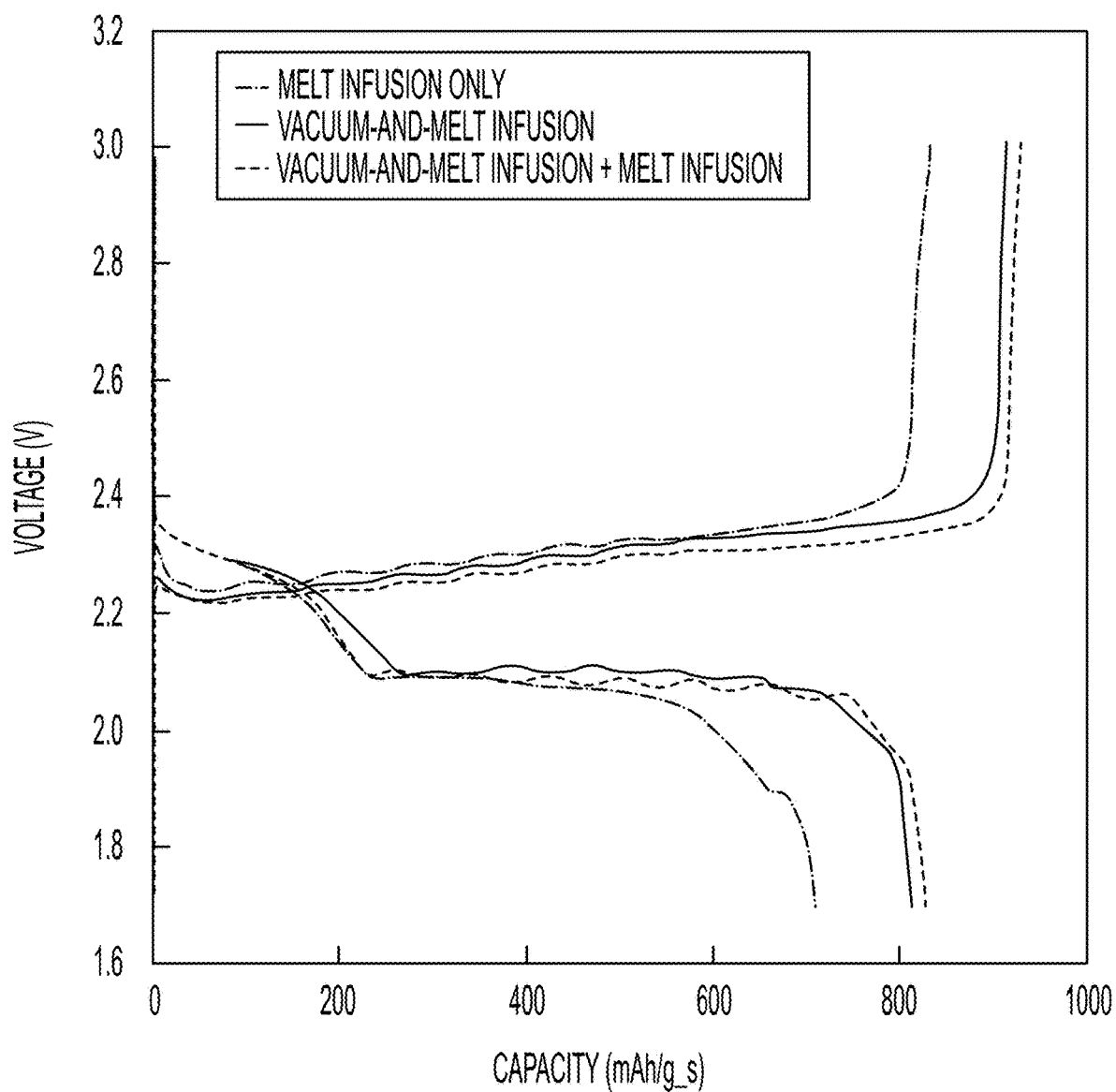
FIG. 5 is a graph showing discharge capacity of lithium-sulfur batteries with different sulfur infusion processes.

With reference to FIG. 5, the voltage versus capacity is graphically shown for conventional sulfur infusion (melt infusion only), the sulfur infusion process of the present application (vacuum-and-melt infusion), and a combination of both processes (vacuum-and-melt infusion+plus melt infusion). FIG. 5 shows lower cell capacity for conventional sulfur infusion techniques compared to the presently disclosed vacuum infused cathode materials. The plot for the combination of processes substantially aligns with the presently disclosed vacuum-and-melt infusion process alone demonstrating that the improvement may be attributed solely to the techniques of the present disclosure.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout, the singular forms "a," "an" and "the" include plural referents unless the context clearly dictates otherwise. Thus, for example, reference to "a" component includes aspects having two or more such components, unless the context clearly indicates otherwise.

Various ranges are provided for parameters throughout this disclosure. It will be appreciated and is explicitly stated that any subrange subsumed by the explicitly disclosed ranges are intended to be disclosed as well herein and are solely omitted for conciseness and brevity. For example, an explicitly disclosed range of 1 wt. % to 40 wt. % also includes 5 wt. % to 31 wt. %, 6.8 wt. % to 29.7 wt. %, and 9.13 wt. % to 26.78 wt. %.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of producing a lithium-sulfur battery cathode by a hybrid vacuum-and-melt method, the method comprising:
    ball milling conductive porous carbon particles and sulfur powder to obtain a fine powder;
    evacuating air from the fine powder in a reaction vessel; and
    heating the reaction vessel under vacuum to melt the sulfur powder in the fine powder and infuse the porous carbon particles with the melted sulfur to form sulfur-infused carbon particles,
    wherein the fine powder further comprises a solid state electrolyte selected from the group consisting of $Li_{1+x}Al_xGe_{2-x}(PO_4)_3$ where x typically equals 0.5 (LAGP), lithium lanthanum zirconate (LLZO), aluminum doped lithium lanthanum zirconate (Al-doped LLZO), niobium doped lithium lanthanum zirconate (Nb-doped LLZO), tantalum doped lithium lanthanum zirconate (Ta-doped LLZO), and lithium aluminum titanium phosphate (LATP).

2. The method of claim 1, wherein the method further comprises encapsulation of the sulfur-infused carbon particles by an encapsulation polymer.

3. The method of claim 1, wherein the method further comprises:

mixing the sulfur-infused porous carbon particles, one or more metal oxide additives, one or more polymer binders, one or more conductive additives, and a solvent in a vessel to form a homogeneous slurry of cathode material;

casting said slurry onto a current collector substrate; and evaporating the solvent in the cast slurry to form the lithium-sulfur battery cathode.

4. The method of claim 1, wherein evacuating air from the fine powder in a reaction vessel comprises reducing the pressure in the reaction vessel to less than 100 mtorr and holding the pressure in the reaction vessel at less than 100 mtorr for at least 1 hour.

5. The method of claim 1, wherein heating the reaction vessel under vacuum to melt the sulfur powder in the fine powder and infuse the porous carbon particles with the melted sulfur comprises:

heating the reaction vessel to an initial temperature of 50° C. to 115° C. while maintaining a pressure in the reaction vessel of less than 100 mtorr;

sealing the reaction vessel to maintain a pressure in the reaction vessel of less than 100 mtorr;

heating the sealed reaction vessel further to a second temperature between the initial temperature and 155° C. to melt the sulfur powder in the fine powder, wherein the second temperature is at least 95° C.; and maintaining the sealed reaction vessel at the second temperature for at least 10 minutes.

6. The method of claim 1, wherein the conductive porous carbon particles are infused with 50 to 85 wt. % sulfur.

7. The method of claim 3, wherein the current collector substrate is a porous carbon current collector substrate, the porosity of the porous carbon current collector substrate wicking the solvent of the homogenous slurry into the porous carbon current collector substrate.

8. The method of claim 7, wherein the porous carbon current collector substrate is selected from the group consisting of carbon nanofoam paper, carbon fiber paper, activated carbon sheet, and carbon fiber veil.

9. The method of claim 1, wherein the conductive porous carbon comprises carbon black.

10. The method of claim 7, wherein the metal oxide is selected from alumina ($Al_2O_3$), silica ($SiO_2$), titania ($TiO_2$), vanadia ($V_2O_5$), and $Mg_{0.6}Ni_{0.4}O$.

11. The method of claim 2, wherein the encapsulation polymer is selected from the group consisting of polyethylene oxide, polypropylene oxide, polypropylene carbonate, polyvinyl acetate, polyvinylpyrrolidone, polydimethylsiloxane-co-polyethylene oxide, polypyrrole, polyanilines, polyethylenedioxythiophene (PEDOT), polyacetylene, polyphenylene vinylene, and copolymers or blends thereof.

* * * * *